US010689079B2

(12) United States Patent
Pennestri et al.

(10) Patent No.: US 10,689,079 B2
(45) Date of Patent: Jun. 23, 2020

(54) JET PUMP SYSTEMS

(71) Applicant: Pennestri Products, LLC, Liberty Lake, WA (US)

(72) Inventors: Scott Anthony Pennestri, Liberty Lake, WA (US); Jamin Lee Juhasz, Post Falls, ID (US)

(73) Assignee: Pennestri Products, LLC, Liberty Lake, WA (US)

( * ) Notice: Subject to any disclaimer, the term of this patent is extended or adjusted under 35 U.S.C. 154(b) by 0 days.

(21) Appl. No.: 16/304,907

(22) PCT Filed: May 27, 2016

(86) PCT No.: PCT/US2016/034643
§ 371 (c)(1),
(2) Date: Nov. 27, 2018

(87) PCT Pub. No.: WO2017/204825
PCT Pub. Date: Nov. 30, 2017

(65) Prior Publication Data
US 2019/0276125 A1    Sep. 12, 2019

(51) Int. Cl.
| | | |
|---|---|---|
| *B63H 11/08* | (2006.01) | |
| *H02K 5/132* | (2006.01) | |
| *H02K 7/00* | (2006.01) | |
| *H02K 7/04* | (2006.01) | |
| *H02K 7/14* | (2006.01) | |
| *H02K 9/22* | (2006.01) | |
| *A63H 23/06* | (2006.01) | |

(52) U.S. Cl.
CPC ............. *B63H 11/08* (2013.01); *H02K 5/132* (2013.01); *H02K 7/003* (2013.01); *H02K 7/04* (2013.01); *H02K 7/14* (2013.01); *H02K 9/22* (2013.01); *A63H 23/06* (2013.01); *B63H 2011/081* (2013.01)

(58) Field of Classification Search
CPC ........ B63H 11/08; H02K 5/132; H02K 7/003; H02K 7/04; H02K 7/14; H02K 9/22
See application file for complete search history.

(56) References Cited

U.S. PATENT DOCUMENTS 5,292,270 A * 3/1994 Tucker ...................... B32B 7/02
                                                          440/82
6,022,250 A * 2/2000 Futaki ................... B63B 35/731
                                                          440/38

(Continued)

*Primary Examiner* — Stephen P Avila
(74) *Attorney, Agent, or Firm* — Lee & Hayes, P.C.

(57) ABSTRACT

A pump assembly includes a motor arranged adjacent to a front surface of a first body, the first body having a cavity arrange between the front surface and a back surface of the first body. The motor may include a rotor having a shaft formed substantially of a single unit of material that is coupled directly to an impeller including a bearing surface received by a cooperating bearing surface arranged in a nozzle. The bearing surface of the impeller, and the cooperating bearing surface of the nozzle, support the impeller rotationally on the shaft such that when the shaft is rotatably displaced by the motor, the impeller displaces the water into the cavity arranged between the front surface of the first body and the back surface of the first body and into the nozzle to create a jet of water.

6 Claims, 9 Drawing Sheets

(56) References Cited

U.S. PATENT DOCUMENTS

| | | | | |
|---|---|---|---|---|
| 2003/0148679 A1* | 8/2003 | Matsuda | ............... | B63H 11/10 |
| | | | | 440/88 G |
| 2004/0097147 A1* | 5/2004 | Fuse | ............... | B63H 11/08 |
| | | | | 440/38 |
| 2008/0226440 A1* | 9/2008 | Therrien | ............... | F04D 29/026 |
| | | | | 415/109 |

* cited by examiner

JET PUMP SYSTEMS

RELATED APPLICATIONS

This application claims the benefit under 35 U.S.C. § 371 of International Application No. PCT/US16/34643, filed on May 27, 2016, the entire contents of which are incorporated herein by reference.

BACKGROUND

Jet pumps exist for remote control (RC) jet boats. Some existing jet pumps include an electric motor having a rotor coupled to a shaft, and the shaft can be coupled to an impeller. However, these existing jet pump assemblies cannot reach high rotation rates (e.g., above about 25,000 revolutions per minute (rpm)). For example, because the rotor of the electric motor is coupled to the shaft, the coupled shaft introduces inefficiencies at least at the coupling (e.g., a universal coupling, a joint, a universal joint, etc.) that prevents the electric motor from rotating the coupled shaft above about 25,000 rpm. Further, because the coupled shaft may be cantilevered (e.g., supported at one end and not supported at the other end), the cantilever introduces inefficiencies at least at the end of the coupled shaft coupled to the impeller that prevents the electric motor from rotating the coupled shaft above about 25,000 rpm.

Accordingly, there remains a need in the art for improved jet pumps that don't introduce inefficiencies, and are capable of reaching high rotation rates above about 25,000 rpm.

SUMMARY

Pump assemblies are configured to create a jet of water. Generally, the pump assemblies may include a motor including a rotor having a shaft formed substantially of a single unit of material that is coupled directly (i.e., void of a coupling, void of a universal coupling, void of a joint, void of a universal joint, etc.) to an impeller including a bearing surface received by a cooperating bearing surface arranged in a nozzle. Because the shaft of the rotor is coupled directly to the impeller, and the impeller has a bearing surface received by the nozzle, the pump assemblies are capable of reaching high rotation rates above about 25,000 revolutions per minute (rpm) for sustained periods of time. This summary is provided to introduce simplified concepts of pump assembly systems, which are further described below in the Detailed Description. This summary is not intended to identify essential features of the claimed subject matter, nor is it intended for use in determining the scope of the claimed subject matter.

In one example, a pump assembly for creating a jet of water includes a motor arrangeable adjacent to a front surface of a first body, the first body having a back surface opposite the front surface and at least a portion of a cavity arranged between the front surface and the back surface. The motor may include a rotor having a shaft extending from the motor and having an end arrangeable adjacent to the back surface of the first body, and the shaft including a substantially single unit of material. An impeller may be coupled to the end of the shaft. The impeller may include a bearing surface receivable by a cooperating bearing surface arranged in a second body (e.g., a nozzle), the second body arrangeable adjacent to the back surface of the first body. The bearing surface of the impeller, and the cooperating bearing surface of the second body, support the impeller rotationally on the shaft such that when the shaft is rotatably displaced by the motor, the impeller displaces the water into the cavity arranged between the front surface of the first body and the back surface of the first body and into the second body to create the jet of water.

In another example, a pump assembly for creating a jet of water includes a nozzle having an outlet opposite an inlet, and a receptacle arranged in the inlet of the nozzle. An impeller having a rear surface opposite a front surface may include a bearing surface that extends from the rear surface of the impeller opposite the front surface of the impeller, and at least a portion of the bearing surface may be received by the receptacle arranged in the inlet of the nozzle. The bearing surface of the impeller, and the receptacle arranged in the inlet of the nozzle, supporting the impeller rotationally.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to pump assemblies for creating a jet of water. For example, the pump assemblies may be arranged with a vessel capable of floating or submerging in water and may create a jet of water using the water the vessel is floating or submerged in. For example, the vessel may be a hull of a remote control (RC) boat, and the pump assembly may create a jet of water to displace the RC boat in the water. Moreover, the pump assembly may employ a motor including a rotor having a shaft formed substantially of a single unit of material. The shaft may be coupled to an impeller without using a coupling, a universal coupling, a joint, a universal joint, etc., and the impeller may have a bearing surface received by a cooperating bearing surface arranged in a nozzle. In this way, the pump assemblies are capable of reaching high rotation rates above about 25,000 revolutions per minute (rpm) for sustained periods of time. While this application describes various embodiments of pump assemblies used in the field of RC boats, this is by way of example and not limitation. For example, the pump assemblies may be used in other fields such as game and/or toy applications (e.g., water guns, water blasters, water soakers, etc.), industrial applications, medical applications, etc.

The pump assemblies may include a first body including a front surface opposite a back surface and at least a portion of a cavity arranged between the front surface of the first body and the back surface of the first body. For example, the first body may be a housing, a pump housing, a manifold, a pump manifold, etc. and the cavity may be water intake, where at least a portion of the water intake is arranged between the front surface of the housing and the back surface of the housing. In one example, the first body may be 3D printed (i.e., additively manufactured (AM)). In another example, the first body may be molded (e.g., injection molded, extrusion molded, compression molded, etc.). The first body may be formed of a substantially single unitary unit of material (e.g., plastic, metal, composite, etc.).

Further, the pump assemblies may include a motor arranged adjacent to the front surface of the first body. The motor may include a rotor having a shaft extending from the motor and through the first body. The shaft of the rotor may include a substantially single unit of material and have an end arranged adjacent to the back surface of the first body. For example, the shaft of the rotor may include a substantially single unitary unit of metal (e.g., steel, aluminum, brass, titanium, etc.), and have an end arranged adjacent to the back surface of the first body coupled to an impeller. In one example, the rotor may include magnets fixed to an end of the shaft that cooperate with a stator of the motor. In the example where the rotor includes magnets fixed to an end of the shaft, the magnets and the shaft may be balanced as an assembly. For example, the rotor, including the magnets and the shaft formed of a substantially single unitary unit of material, may be dynamically balanced (e.g., spin balanced) relative to a longitudinal axis of the rotor assembly.

The impeller may include a bearing surface. In one example, the bearing surface may extend from a rear surface of the impeller opposite a front surface of the impeller. In another example, the bearing surface may comprise a protrusion having a substantially cylindrical shape extending from the rear surface of the impeller opposite the front surface of the impeller. The bearing surface may be received by a cooperating bearing surface arranged in a second body. For example, the bearing surface may be received by a receptacle arranged in an inlet of a nozzle. The bearing surface of the impeller and the cooperating bearing surface of the second body may support the impeller rotationally on the shaft of rotor such that when the rotor is rotatably displaced by the motor, the impeller displaces water into the cavity arranged between the front surface of the first body and the back surface of the first body and into the second body to create the jet of water.

In the example where the bearing surface may be received by a receptacle arranged in an inlet of a nozzle, the nozzle may include an aperture arranged in an end of the receptacle arranged in the inlet of the nozzle, and a gap may be arranged between the bearing surface extending from the rear surface of the impeller and the receptacle arranged in the inlet of the nozzle. The gap and the aperture arranged in the end of the receptacle arranged in the inlet of the nozzle to provide for water to be displaced across the bearing surface of the impeller to receive heat from the bearing surface of the impeller or heat from the receptacle arranged in the inlet of the nozzle when the impeller is rotationally displaced. For example, when the impeller is rotationally displaced, the impeller displaces water across the bearing surface of the impeller through the gap, and through the aperture arranged in the end of the receptacle arranged in the inlet of the nozzle, the water displaced across the bearing surface of the impeller and through the aperture receiving heat from the rotating bearing surface of the impeller or heat from the receptacle arranged in the inlet of the nozzle.

Illustrative Pump Assemblies

Figure 1:
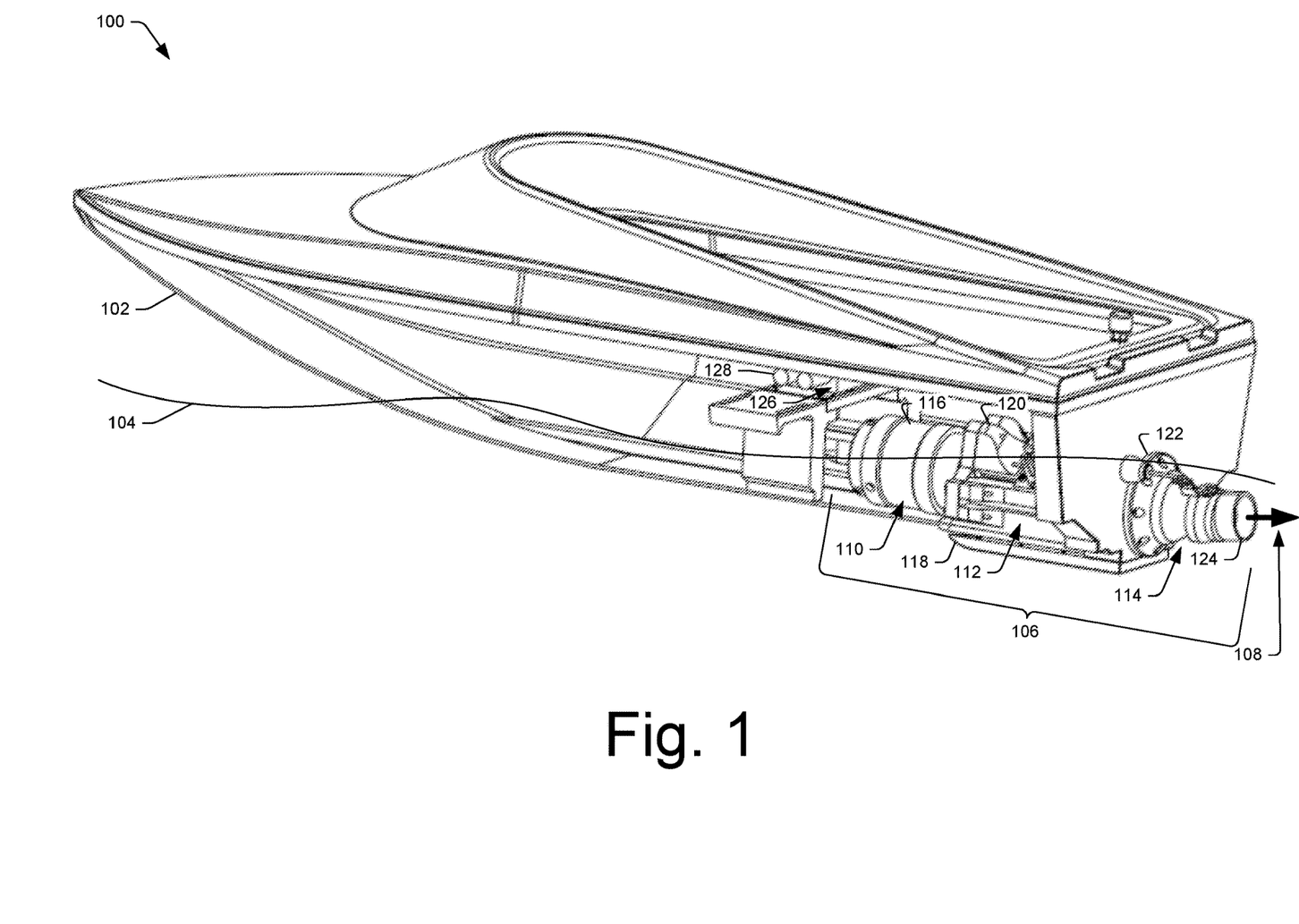
FIG. 1 illustrates an example water environment involving a vessel capable of floating or submerging in water.

FIG. 1 illustrates an example water environment 100 involving a vessel 102 capable of floating or submerging in water 104. For example, the water environment 100 may be a body of water (e.g., a lake, a pond, a pool, a puddle, a river, a stream, an ocean, etc.) and the vessel 102 may be a hull of a boat (e.g., remote control (RC) boat). FIG. 1 illustrates a pump assembly 106 may be arranged with the vessel 102 for creating a jet of water 108 that displaces the vessel 102 in the water 104. For example, the pump assembly 106 may include a motor assembly 110 arranged in the vessel, a housing assembly 112 arranged with the vessel, and a nozzle assembly 114 arranged with the vessel.

The motor assembly 110 may include a heat exchanger 116 for cooling a motor (e.g., an electric motor) of the motor assembly 110. The housing assembly 112 may include a water intake port 118 that provides for the water 104 to be displaced into a first body 120 (e.g., a housing, a pump housing, a manifold, a pump manifold, etc.). The nozzle assembly 114 may include a nozzle 122 that receives the water 104 displaced into the first body 120 to form the jet of water 108. The nozzle assembly 114 may include a steering nozzle 124 that directs the jet of water 108.

The pump assembly 106 may include electronics 126 and a heat exchanger 128 for cooling the electronics 126. The electronics 126 may be an electronic controller for controlling the electric motor of the pump assembly 106 and/or the steering nozzle 124. A battery (not shown) may be arranged in the vessel 102 for providing electric power to the pump assembly 106.

While FIG. 1 illustrates a water environment 100 where the pump assembly 106 is arranged with a vessel capable of floating in the water 104, other types of water environments may occur. For example, a water environment may occur where the pump assembly 106 may be arranged in a vessel capable of submerging in the water 104. In another example, a water environment may occur where the pump assembly 106 may be arranged in a vessel capable of submerging in a container (e.g., a tank, a bladder, a reservoir, etc.).

Figure 2:
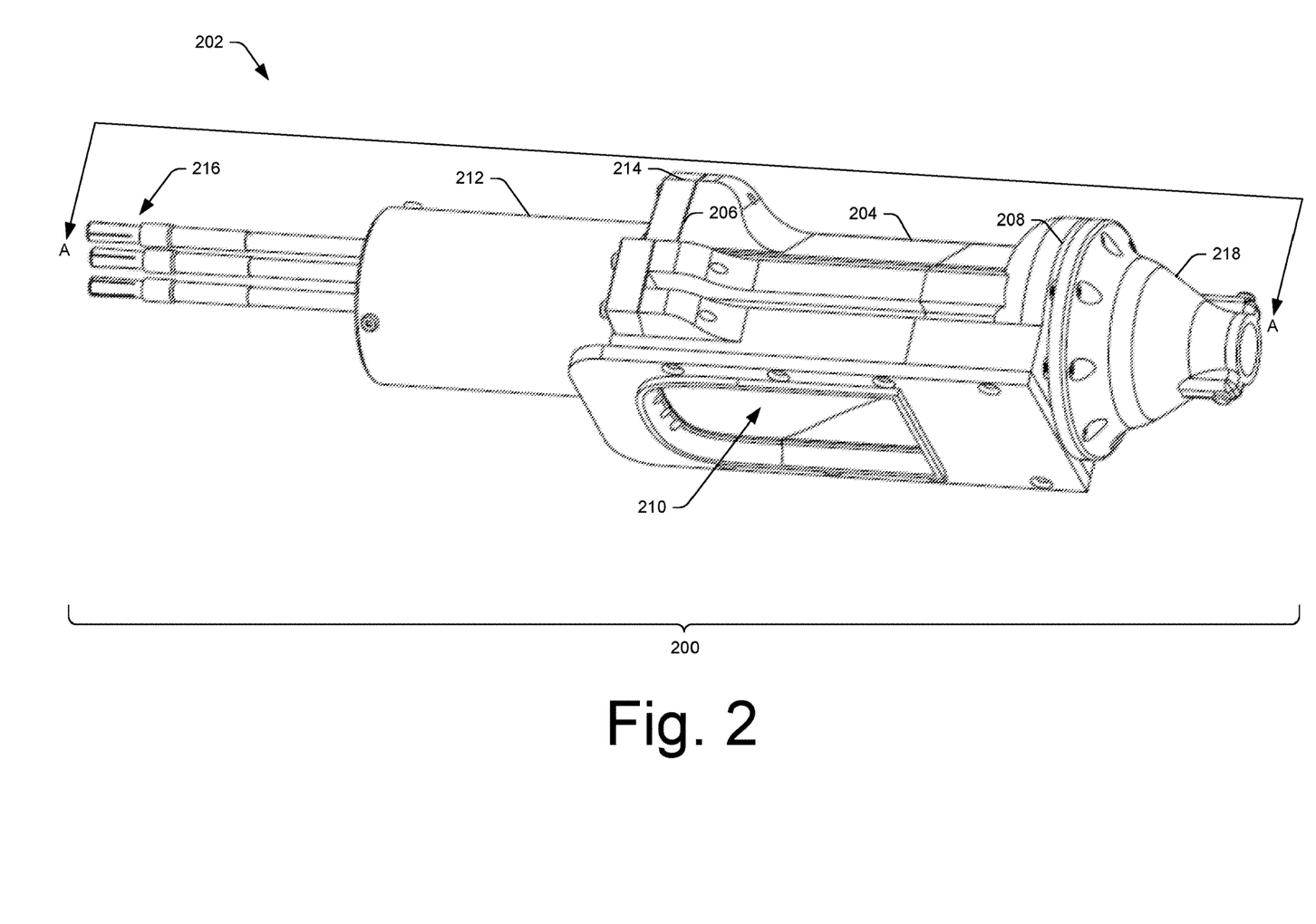
FIG. 2 illustrates a perspective view of an example pump assembly for creating a jet of water.

FIG. 2 illustrates a perspective view 200 of an example pump assembly 202 for creating the jet of water 108 shown in FIG. 1. The pump assembly 202 can be the pump assembly 106 shown in FIG. 1. FIG. 2 illustrates the pump assembly 202 may include a first body 204 having a front surface 206 and a back surface 208 opposite the front surface 206. The first body 204 may be a housing, a pump housing, a manifold, a pump manifold, etc. FIG. 2 illustrates at least a portion of a cavity 210 arranged between the front surface 206 of the first body 204 and the back surface 208 of the first body 204.

A motor 212 may be arranged adjacent to the front surface 206 of the first body 204. For example, an end of the motor 212 may be arranged adjacent to a plate 214 arranged between the front surface 206 of the first body 204 and the motor 212 arranged adjacent to the front surface 206 of the first body 204. The motor 212 may be an electric motor and receive power from one or more batteries (not shown) via one or more wires 216. A second body 218 may be arranged adjacent to the back surface 208 of the first body 204. The second body 218 can be a nozzle (e.g., nozzle 122) that receives water 104 displaced into the first body 204 to form the jet of water 108.

FIG. 2 illustrates a section line A-A taken along a longitudinal axis of the pump assembly 202.

Figure 3:
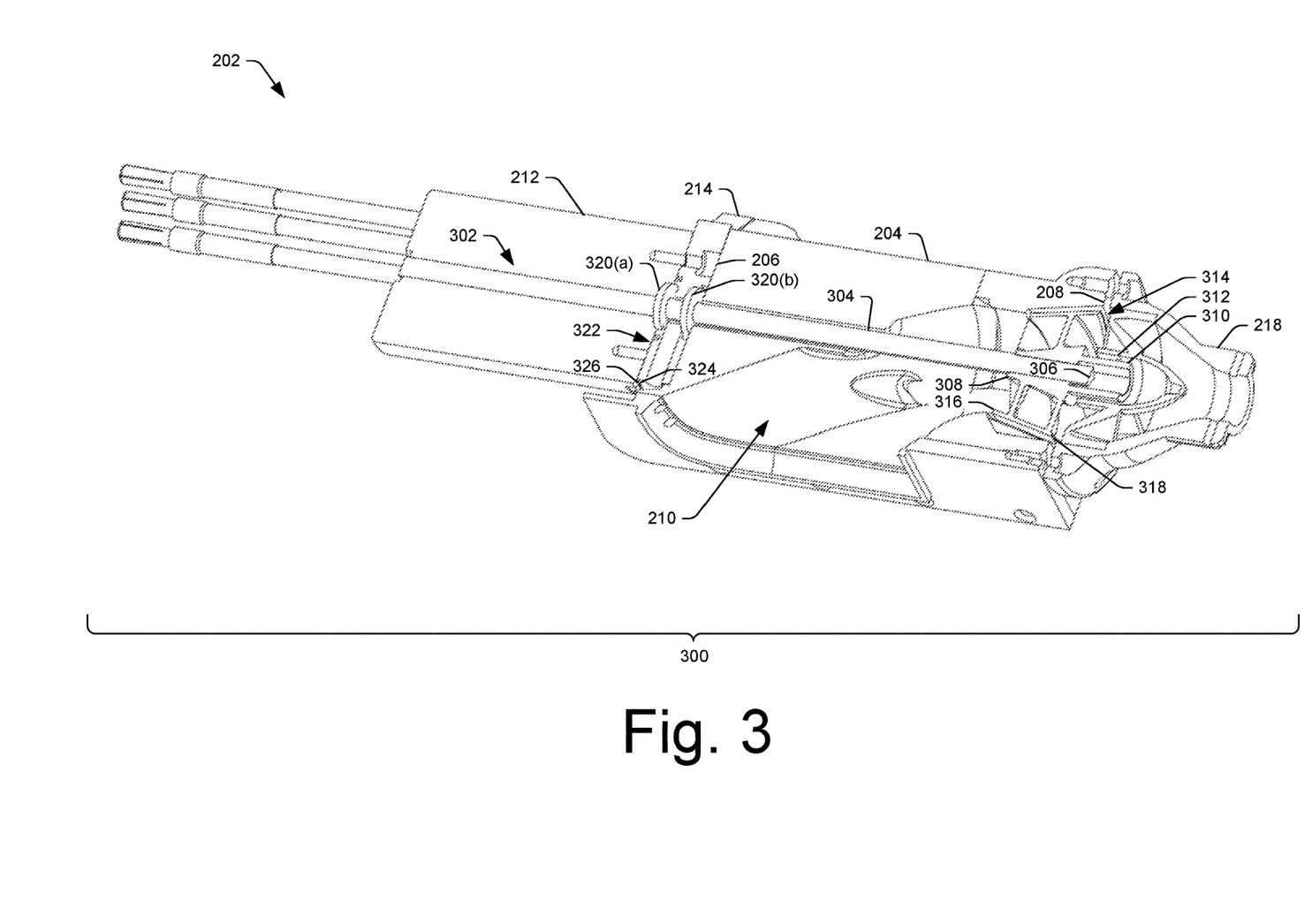
FIG. 3 illustrates a section view of the example pump assembly for creating a jet of water shown in FIG. 2.

FIG. 3 illustrates a section view 300 of the pump assembly 202 taken along the section line A-A. Section view 300 shows the motor 212 may include a rotor 302 having a shaft 304 extending from the motor 212 and through the first body 204. The shaft 304 may be a substantially single unit of material (e.g., metal, plastic, composite, etc.) and may have an end 306 arranged adjacent to the back surface 208 of the first body 204.

Section view 300 shows an impeller 308 may be fixed to the end 306 of the shaft 304. The impeller 308 may include a bearing surface 310 received by a cooperating bearing surface 312 arranged in the second body 218. As discussed above, the second body 218 may be arranged adjacent to the back surface 208 of the first body 204. The second body 218 may be a nozzle (e.g., nozzle 122) to make the jet of water 108.

The bearing surface 310 of the impeller 308, and the cooperating bearing surface 312 of the second body 218 may support the impeller 308 rotationally on the shaft 304 such that when the shaft 304 is rotatably displaced by the motor 212, the impeller 308 displaces water 104 into the cavity 210 arranged between the front surface 206 of the first body 204 and the back surface 208 of the first body 204 and into the second body 218 to create the jet of water 108.

Because the shaft 304 of the motor 212 is fixed directly to the impeller 308, and void of a coupling, a universal coupling, a joint, a universal joint etc., the shaft 304 fixed directly to the impeller does not introduce inefficiencies associated with a coupling, a universal coupling, a joint, a universal joint etc., and provides for the motor 212 to rotate the shaft 304 above about 25,000 rpm. In another example, because the shaft 304 of the motor 212 is fixed directly to the impeller 308, this may provide for the motor 212 to rotate the shaft 304 at about 30,000 rpm. In another example, because the shaft 304 of the motor 212 is fixed directly to the impeller 308, this may provide for the motor 212 to rotate the shaft 304 up to at about 40,000 rpm.

Further, because the shaft 304 is fixed directly to the impeller 308 that is supported in the second body 218, the shaft 304 is not cantilevered (e.g., supported at one end and not supported at the other end). Rather, the shaft 304 is supported by the motor 212 (e.g., bearings of the motor) at one end and supported by the impeller 308 at the other end 306. Because, the shaft 304 is supported at the ends and is not cantilevered, the shaft 304 does not introduce inefficiencies at least at the end 306 of the shaft 304 coupled to the impeller 308, and provides for the motor 212 to rotate the shaft 304 above about 25,000 rpm.

Section view 300 shows the first body 204 may include a cooperating receptacle 314 arranged in the back surface 208 of the first body 204. The cooperating receptacle 314 may be communicatively coupled to the cavity 210 arranged between the front surface 206 of the first body 204 and the back surface 208 of the first body 204. For example, the cooperating receptacle 314 may have an open end arranged in the cavity 210 to provide for water to be displaced from the cavity to the cooperating receptacle 314. Section view 300 shows at least a portion of the impeller 308 may be received by the cooperating receptacle 314 arranged in the back surface 208 of the first body 204. For example, the impeller 308 may include a front surface 316 and a back surface 318 opposite the front surface 316, and the front surface 316 of the impeller 308 may be received by the cooperating receptacle 314 arranged in the back surface 208 of the first body 204.

Section view 300 shows gaskets 320(a) and 320(b) may be arranged around the shaft 304 extending from the motor 212. The gasket 320(a) may provide for sealing an interface 322 between a sealing surface 324 of the plate 214 and a surface 326 of the motor 212. The gasket 320(b) may provide for sealing an interface between a sealing surface of the plate and the back surface 318 of the first body 204.

Figure 4:
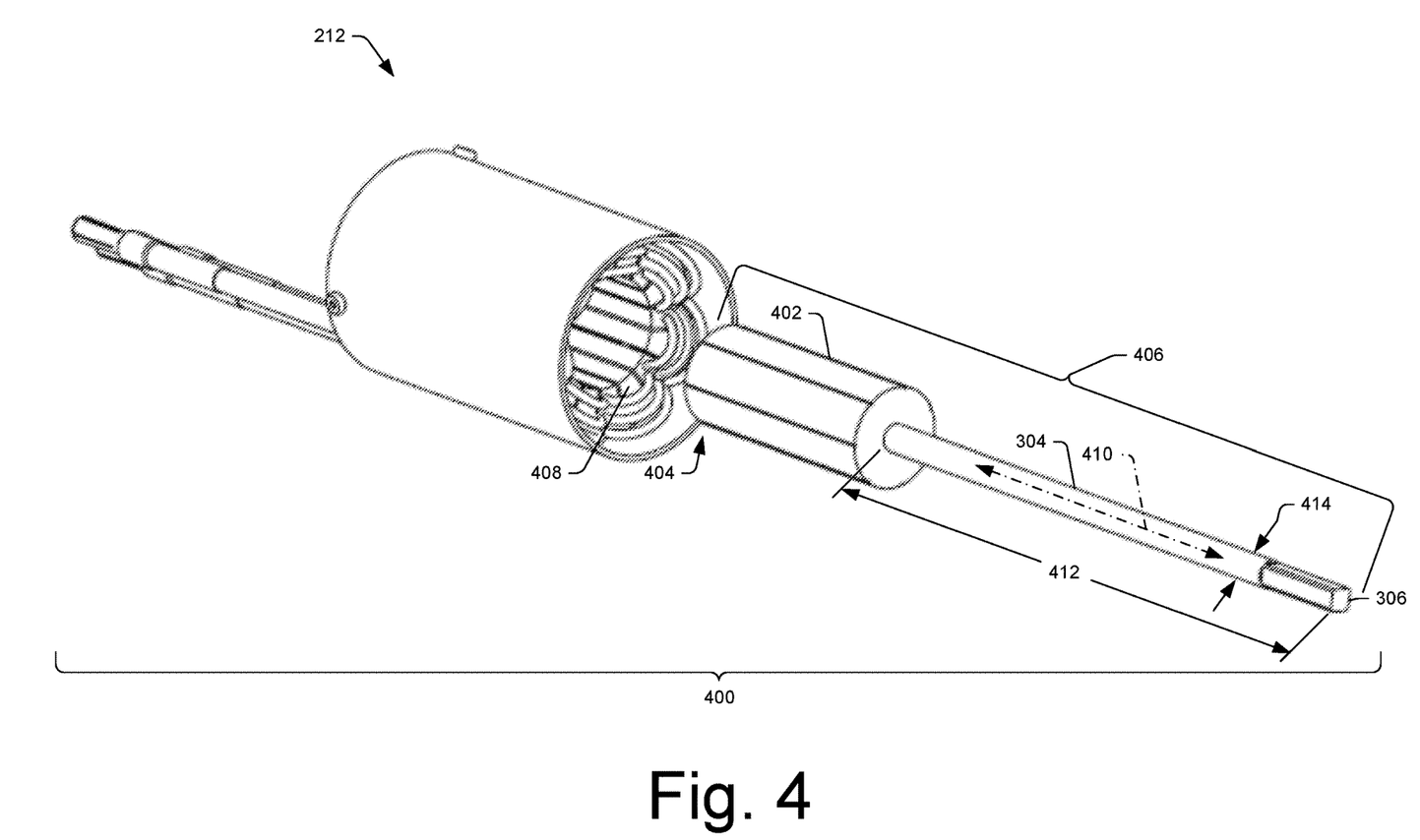
FIG. 4 illustrates an exploded assembly view of the motor shown in FIGS. 2 and 3.

FIG. 4 illustrates an exploded assembly view 400 of the motor 212 shown in FIGS. 2 and 3. The exploded assembly view 400 of the motor 212 shows the shaft 304 may include a substantially single unitary unit of metal (e.g., steel, aluminum, brass, titanium, etc.) having one or more magnets 402 fixed to an end 404 of the shaft 304 opposite the end 306. The shaft 304 and the one or more magnets 402 defining a rotor 406 of the motor 212. The rotor 406 can be the rotor 302 shown in FIG. 3. The rotor 406 to cooperate with a stator 408 of the motor 212 to rotatably displace the rotor 406. The rotor 406, including the one or more magnets 402 and the shaft 304, may be dynamically balanced (e.g., spin balanced) relative to a longitudinal axis 410 of the rotor 406. In one example, the shaft 304 may have a length 412 of about 4 inches (100 millimeters) extending from the magnets 402 to the end 306 of the shaft 304. In another example, the shaft 304 may have a length 412 of at least about 2 inches (50 millimeters) to at most about 10 inches (254 millimeters). The shaft 304 may have an outside diameter 414 of about 0.2 inches (5 millimeters). In another example, the shaft 304 may have an outside diameter 414 of at least about 0.1 inches (3 millimeters) to at most about 0.4 inches (9 millimeters). For example, the shaft 304 may have an outside diameter 414 of at least about 0.1 inches (3 millimeters) to at most about 0.4 inches (9 millimeters) for displacing remote control (RC) boats. In another example, the shaft 304 may have an outside diameter 414 of about 0.8 inches (20 millimeters). For example, the motor 212 and shaft 304 may be scaled up so that the shaft 304 has an outside diameter 414 of about 0.8 inches (20 millimeters) to provide for displacing other vessels. For example, the motor 212 and shaft 304 may be scaled up to provide for displacing a powered body board, a powered surfboard, a powered paddle board, a powered kayak, etc. In another example, the length 412 and outside diameter 414 of the shaft 304 may have a size ratio (i.e., length of the shaft divided by outside diameter of the shaft) of about 20.3 to provide for scaling to the requirements of larger and smaller sized pumps (e.g., larger and smaller pump assembly 106).

While the exploded assembly view 400 shows the end 306 of the shaft 304 having a rectangular cross-sectional shape to provide for fixing the end 306 of the shaft 304 to the impeller 308, other shapes are contemplated for fixing the end 306 of the shaft 304 to the impeller 308. For example, the end 306 of the shaft 304 may have a triangular cross-sectional shape, a circular cross-sectional shape, a conical cross-sectional shape, etc. for fixing the end 306 of the shaft 304 to the impeller 308. Moreover, the end 306 of the shaft 304 may have a boss, a nodule, a ridge, a protrusion for fixing the end 306 of the shaft 304 to the impeller 308. Further, the end 306 of the shaft 304 may have a notch, a groove, a pocket for fixing the end 306 of the shaft 304 to the impeller 308.

Figure 5:
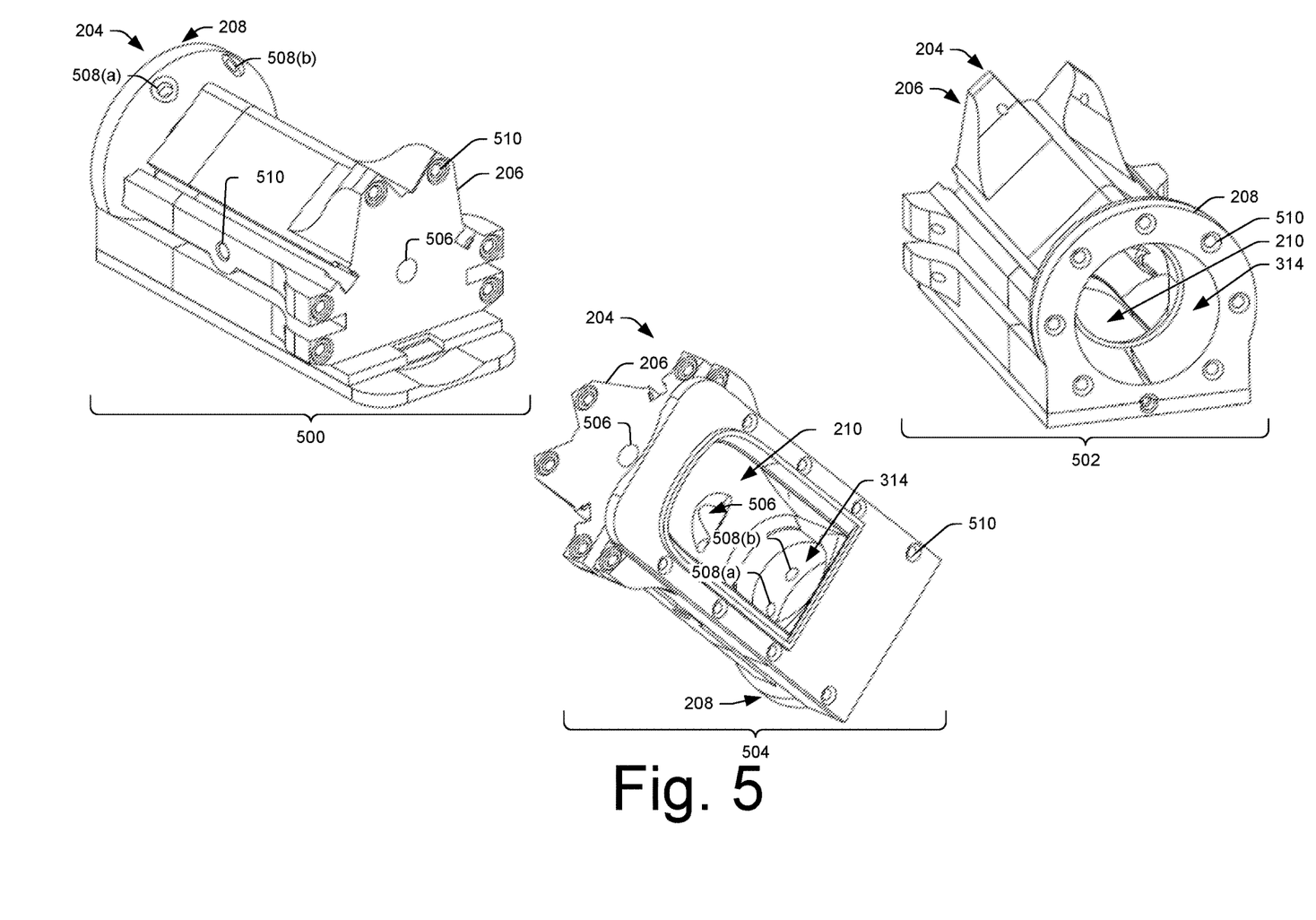
FIG. 5 illustrates a front perspective view, a back perspective view, and a bottom perspective view of the first body shown in FIGS. 2 and 3.

FIG. 5 illustrates a front perspective view 500, a back perspective view 502, and a bottom perspective view 504 of the first body 204 shown in FIGS. 2 and 3. While FIG. 5 shows the first body 204 may be formed separately from the vessel 102, the first body 204 and the vessel 102 may be formed together of a substantially single unitary unit of material (e.g., plastic, metal, composite, etc.). For example, the first body 204 and the vessel 102 (e.g., hull of a boat) may be 3D printed (i.e., additively manufactured (AM)) as a single unit.

The first body 204 may be a housing, a pump housing, a manifold, a pump manifold, etc. and the cavity 210 may be a water intake, where at least a portion of the water intake is arranged between the front surface 206 of the housing and the back surface 208 of the housing. In one example, the first body 204 may be 3D printed (i.e., additively manufactured (AM)). In another example, the first body 204 may be molded (e.g., injection molded, extrusion molded, compression molded, etc.). The first body 204 may be formed of a substantially single unitary unit of material (e.g., plastic, metal, composite, etc.).

The front perspective view 500 shows the front surface 206 of the first body 204 may be a substantially planar surface to provide for interfacing with the plate 214. An aperture 506 may be arranged in the front surface 206 of the plate 214 for receiving at least a portion of the shaft 304 extending from the motor 212. For example, the aperture 506 may be a through hole from the front surface 206 of the plate 214 to the cavity 210 of the first body 204. The front perspective view 500 shows ports 508(*a*) and 508(*b*) arranged proximate to the back surface 208 of the first body 204. Each of the ports 508(*a*) and 508(*b*) may be communicatively coupled to the cooperating receptacle 314 arranged in the back surface 208 of the first body 204 to transport water from the cooperating receptacle 314 arranged in the back surface 208 of the first body 204 to a heat exchanger. The ports 508(*a*) and 508(*b*) may provide for transporting water from the cooperating receptacle 314 arranged in the back surface 208 of the first body 204 to the heat exchanger 116 for cooling a motor (e.g., electric motor) of the motor assembly 110 and/or to the heat exchanger 128 for cooling the electronics 126. The ports 508(*a*) and 508(*b*) may receive fluid fittings (e.g., hose barbs) that provide for coupling tubes to the fittings and the heat exchangers 116 and/or 128. Front perspective view 500 shows at least one port 510 arranged between the front surface 206 of the first body 204 and the back surface 208 of the first body 204. The at least one port 510 may be communicatively coupled to the cavity 210 arranged between the front surface 206 of the first body 204 and the back surface 208 of the first body 204 to transport water from an inside of the vessel 102 to the cavity 210 arranged between the front surface 206 of the first body 204 and the back surface 208 of the first body 204. For example, the at least one port 510 may transport water from an inside of a hull of a boat to the cavity 210 to drain the hull of the boat. The at least one port 510 may receive a fluid fitting (e.g., hose barbs) that provides for coupling a tube to the fitting.

Back perspective view 502 shows the back surface 208 of the first body 204 may include the cooperating receptacle 314 arranged in the back surface 208 of the first body 204 and communicatively coupled to the cavity 210 arranged between the front surface 206 of the first body 204 and the back surface 208 of the first body 204. As discussed above with regard to FIG. 3, the cooperating receptacle 314 may receive at least a portion of the impeller 308. In some examples, the cooperating receptacle 314 may receive a wear ring and at least a portion of the impeller 308. For example, a wear ring may be arranged between a surface of the cooperating receptacle 314 of the first body 204 and a surface of impeller 308 to prevent debris (e.g., sand, dirt, gravels, rocks, etc.) from abrading the surface of the cooperating receptacle 314 and/or the surface of the impeller 308.

Front perspective view 500, back perspective view 502, and bottom perspective view show a plurality of fasteners 512. The fasteners 512 arranged in the front surface 206 of the first body 204 may provide for mounting the plate 214 to the front surface 206 of the first body 204. The fasteners 512 arranged in the back surface 208 of the first body 204 may provide for mounting the second body 218 and/or the first body 204 to the vessel 102. The fasteners 512 arranged in the bottom surface of the first body 204 may provide for mounting the first body 204 to the vessel 102.

Figure 6:
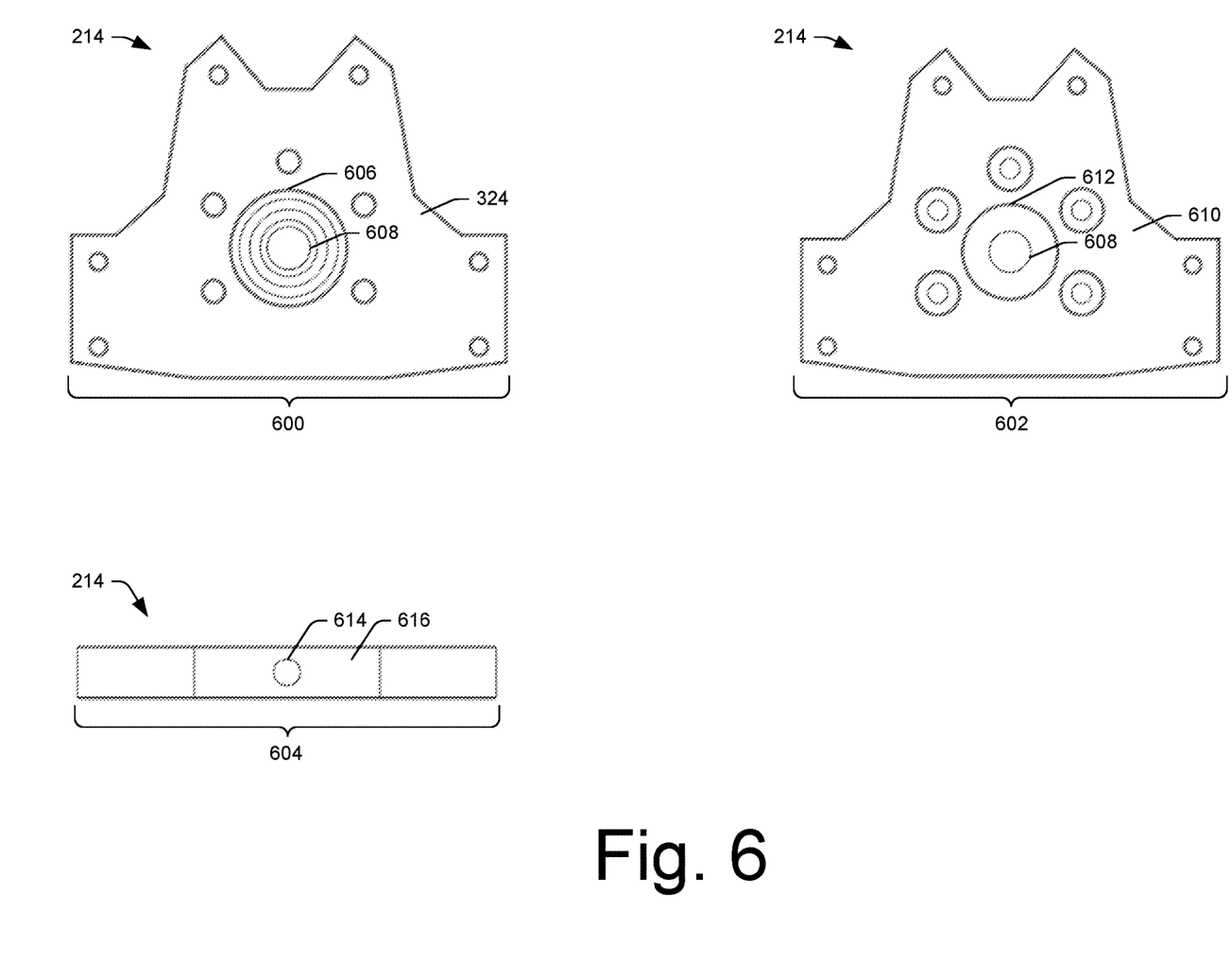
FIG. 6 illustrates a front view, a back view, and a bottom view of the plate shown in FIGS. 2 and 3.

FIG. 6 illustrates a front view 600, a back view 602, and a bottom view 604 of the plate 214 shown in FIGS. 2 and 3. The front view 600 of the plate 214 shows the sealing surface 324 of the plate 214 may include a pocket 606 arranged around a through hole 608 arranged in the plate 214. The pocket 606 may be for receiving the gasket 320(*a*) arranged around the shaft 304 of the motor 212. For example, the pocket 606 may be an O-ring groove for receiving an O-ring arranged around the shaft 304 of the motor 212.

The back view 602 of the plate 214 shows a sealing surface 610 of the plate 214 may include a pocket 612 arranged around the through hole 608 arranged in the plate 214. The pocket 612 may be for receiving the gasket 320(*b*) arranged around the shaft 304 of the motor 212. For example, the pocket 612 may be an O-ring groove for receiving an O-ring arranged around the shaft 304 of the motor 212.

The bottom view 604 of the plate 214 shows the plate 214 may include a hole 614 arranged in a bottom surface 616 of the plate 214. The hole 614 may provide for water that may be contained in the through hole 608 to drain from the through hole 608 and out of the hole 614 arranged in the bottom surface 616 of the plate 214. For example, the hole 614 may be a weep hole that allows water to weep from the through hole 608 arranged in the plate 214. In one example, the plate 214 may be 3D printed (i.e., additively manufactured (AM)). In another example, the plate 214 may be molded (e.g., injection molded, extrusion molded, compression molded, etc.). The plate 214 may be formed of a substantially single unitary unit of material (e.g., plastic, metal, composite, etc.).

Figure 7:
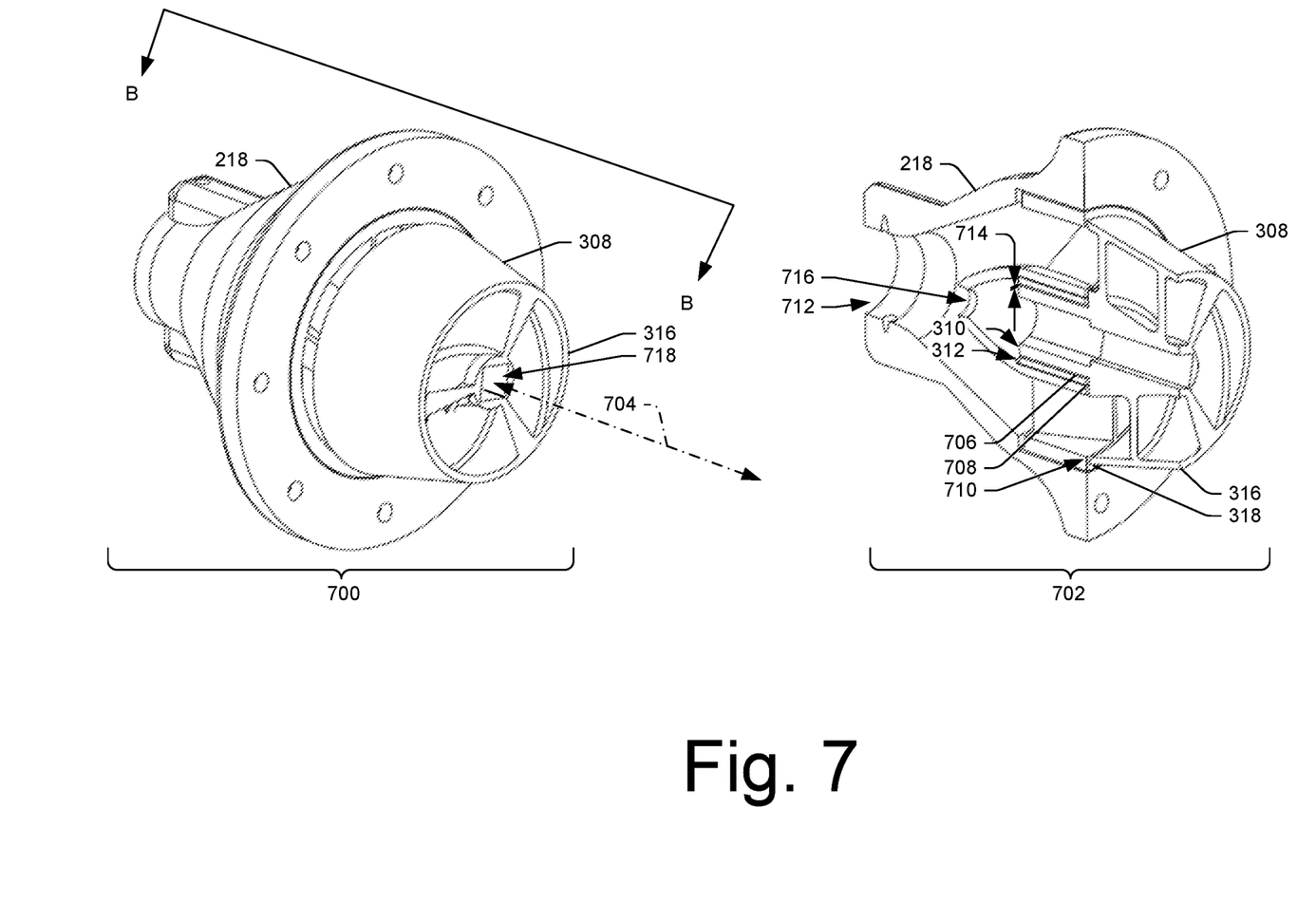
FIG. 7 illustrates a front perspective view and a section view of the impeller including the bearing surface received by the cooperating bearing surface arranged in the second body shown in FIGS. 2 and 3.

FIG. 7 illustrates a front perspective view 700 and a section view 702 of the impeller 308 including the bearing surface 310 receivable by the cooperating bearing surface 312 arranged in the second body 218 shown in FIGS. 2 and 3. The front perspective view 700 shows a section line B-B taken along a longitudinal axis 704 of the impeller 308 and the second body 218.

The section view 702 shows the cooperating bearing surface 312 of the second body 218 may include a sleeve 706 (e.g., a bushing or a bearing) fixed in a receptacle 708 arranged in an inlet 710 of the second body 218 opposite an outlet 712 of the second body 218. For example, the sleeve 706 may be press fit, snap fit, adhered (e.g., glued), threaded, pined, etc. in the receptacle 708 arranged in the inlet 710 of the second body 218. The sleeve 706 may be formed of a material harder than the bearing surface 310 of the impeller 308 and may provide for the bearing surface 310 to be rotatably displaced relative to the second body 218 and prevent the cooperating bearing surface 312 from being deteriorated or worn down by the rotating bearing surface 310 of the impeller 308. The sleeve 706 may be formed of ceramic, metal, plastic, composite, etc. having hardness greater than a hardness of a material (e.g., plastic) forming the bearing surface 310 of the impeller 308.

The section view 702 shows a gap 714 arranged between the bearing surface 310 of the impeller 308 and sleeve 706 arranged in the receptacle 708 arranged in the inlet 710 of the second body 218. For example, the bearing surface 310 of the impeller 308 may have an outside diameter less than an inside diameter of the sleeve 706 to allow water to be displaced across the bearing surface 310 of the impeller 308 through the gap 714 between the bearing surface 310 of the impeller 308 and the sleeve 706 arranged in the receptacle 708 of the second body 218. In the example where the cooperating bearing surface 312 of the second body 218 does not include the sleeve 706 fixed in the receptacle 708 of the second body 218, the gap 714 may be between the bearing surface 310 of the impeller 308 and the receptacle 708 arranged in the inlet 710 of the second body 218. For example, the bearing surface 310 of the impeller 308 may have an outside diameter less than an inside diameter of the receptacle 708 to allow water to be displaced across the bearing surface 310 of the impeller 308 through the gap 714 between the bearing surface 310 of the impeller 308 and the receptacle 708 arranged in the inlet 710 of the second body 218. The gap 714 may be at least about 0.002 inches (0.05 millimeters) to at most about 0.06 inches (1.5 millimeters).

While FIG. 7 illustrates the second body 218 may include two separate parts (i.e., a thrust cone and a diverter) assembled together, the second body 218 may be a one piece thrust cone with an integral diverter which houses the sleeve 706. For example, the second body 218 may be a thrust cone and diverter formed of a substantially single unitary unit of material (e.g., plastic, metal, composite, etc.), and the sleeve 706 may be fixed in a receptacle arranged in the inlet of the thrust cone. In the example where the second body 218 may include two separate parts (i.e., a thrust cone and a diverter) assembled together, the thrust cone may be formed of metal and the diverter may be formed of a plastic. In the example where the thrust cone may be formed of metal and the diverter may be formed of plastic, the diverter may be press fit, snap fit, adhered (e.g., glued), threaded, pined, etc. in the thrust cone.

The section view 702 shows an aperture 716 arranged in an end of the receptacle 708 arranged in the inlet 710 of the second body 218. The aperture 716 arranged in the end of the receptacle 708 may provide for the water being displaced across the bearing surface 310 of the impeller 308 to exit the receptacle 708 arranged in the inlet 710 of the second body 218.

The front perspective view 700 shows a cooperating receptacle 718 arranged in the front surface 316 of the impeller 308 for fixing the impeller 308 to the end 306 of the shaft 304 of the motor 212. When the impeller 308 is rotationally displaced by the shaft 304 of the motor 212, the impeller 308 displaces at least a portion of the water across the bearing surface 310 of the impeller 308 through the gap 714, and through the aperture 716 arranged in the end of the receptacle 708 arranged in the inlet 710 of the second body 218 (e.g., nozzle), the water displaced across the bearing surface 310 of the impeller 308 and through the aperture 716 to receive heat from the bearing surface 310 of the impeller 308 or heat from the receptacle 708 arranged in the inlet 710 of the second body 218. In the example where the sleeve 706 is fixed in the receptacle 708 of the second body 218, the water displaced across the bearing surface 310 of the impeller 308 and through the aperture 716 may receive heat from the bearing surface 310 of the impeller 308 or heat from the sleeve 706 fixed in the receptacle 708 of the second body 218. The heat may be caused by friction. For example, the rotation of the impeller 308 may result in friction between the bearing surface 310 of the impeller 308 and the receptacle 708 or the sleeve 706.

While the front perspective view 700 shows the cooperating receptacle 718 having a rectangular cross-sectional shape to provide for fixing the end 306 of the shaft 304 to the impeller 308, other shapes are contemplated for fixing the end 306 of the shaft 304 to the impeller 308. For example, the cooperating receptacle 718 may have a triangular cross-sectional shape, a circular cross-sectional shape, a conical cross-sectional shape, etc. for fixing the end 306 of the shaft 304 to the impeller 308. Moreover, the cooperating receptacle 718 may have a boss, a nodule, a ridge, a protrusion for fixing the end 306 of the shaft 304 to the impeller 308. Further, the cooperating receptacle 718 may have a notch, a groove, a pocket for fixing the end 306 of the shaft 304 to the impeller 308.

In one example, the second body 218 may be 3D printed (i.e., additively manufactured (AM)). In another example, the second body 218 may be molded (e.g., injection molded, extrusion molded, compression molded, etc.). The second body 218 may be formed of a substantially single unitary unit of material (e.g., plastic, metal, composite, etc.).

In one example, the impeller 308 may be 3D printed (i.e., additively manufactured (AM)). In another example, the impeller 308 may be molded (e.g., injection molded, extrusion molded, compression molded, etc.). The impeller 308 may be formed of a substantially single unitary unit of material (e.g., plastic, metal, composite, etc.).

Figure 8:
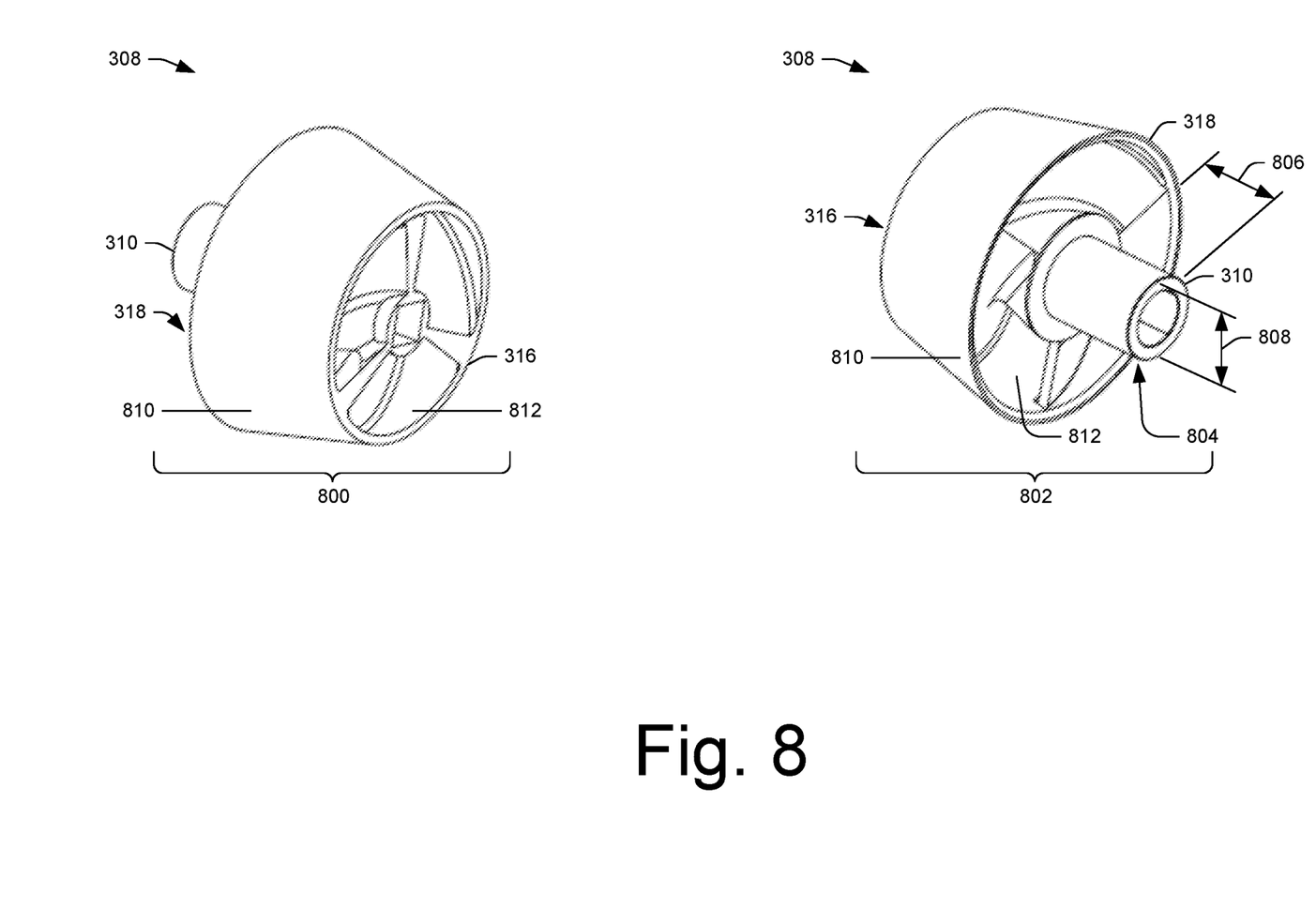
FIG. 8 illustrates a front perspective view and a back perspective view of the impeller shown in FIGS. 3 and 7.

FIG. 8 illustrates a front perspective view 800 of the impeller 308 and a back perspective view 802 of the impeller 308 shown in FIGS. 3 and 7. The front perspective view 800 and the back perspective view 802 show the bearing surface 310 extending from the back surface 318 of the impeller 308 opposite the front surface 316 of the impeller 308. The back perspective view 802 shows the bearing surface 310 of the impeller 308 may comprises a protrusion 804 having a substantially cylindrical shape receivable by the cooperating bearing surface 312 arranged in the second body 218. The bearing surface 310 may extend a distance 806 of at least about 0.25 inches (6.3 millimeters) to at most about 1 inch (25 millimeters) from the back surface 318. The bearing surface 310 may have an outside diameter 808 of at least about 0.2 inches (5 millimeters) to at most about 2 inches (50 millimeters). While FIG. 8 illustrates the bearing surface 310 may have an outside diameter 808 of at least about 0.2 inches (5 millimeters) to at most about 2 inches (50 millimeters), the bearing surface 310 may be scaled up beyond an outside diameter of about 2 inches (50 millimeters). For example, a pump assembly (e.g., pump assembly 106) may be scaled up to requirements of larger sized pumps, and thus the impeller 308 may be scaled up to the requirements of the larger sized pumps. In the example, where the pump assembly 106 may be scaled up to requirements of larger sized pumps, the larger sized pumps may be scaled up to provide for displacing a powered body board, a powered surfboard, a powered paddle board, a powered kayak, etc.

The front perspective view 800 and the back perspective view 802 show the impeller 308 may include an exterior surface 810 opposite an interior surface 812 arranged between the back surface 318 of the impeller 308 opposite the front surface 316 of the impeller 308. The exterior surface 810 of the impeller 308 may comprise a substantially conical shape, and at least a portion of the exterior surface 810 comprising the substantially conical shape may be receivable by the cooperating receptacle 314 arranged in the back surface 208 of the first body 204.

The front perspective view 800 and the back perspective view 802 show the impeller 308 may include blades 814 arranged from the front surface 316 to the back surface 318 of impeller 308. The blades 814 may provide for displacing water from the front surface 316 of the impeller 308 to the back surface 318 of the impeller 308.

Figure 9:
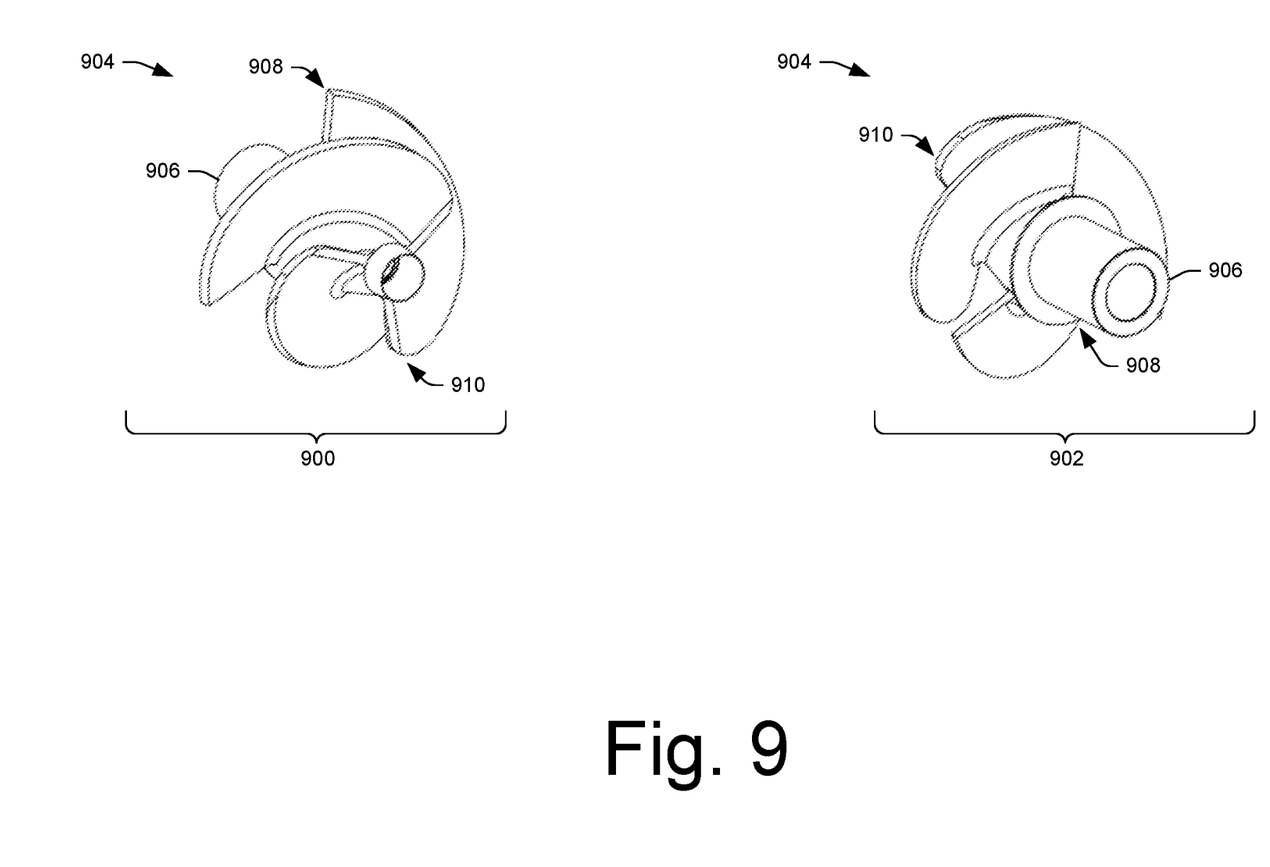
FIG. 9 illustrates a front perspective view and a back perspective view of another example impeller.

FIG. 9 illustrates a front perspective view 900 and a back perspective view 902 of another example impeller 904. The front perspective view 900 and the back perspective view 902 show a bearing surface 906 extending from a back surface 908 of the impeller 904 opposite a front surface 910 of the impeller 308. The bearing surface 906 can be the bearing surface 310. The front perspective view 900 and the back perspective view 902 show the impeller 904 is void of an exterior surface (e.g., exterior surface 810 shown in FIG. 8). In one example, the impeller 904 may be 3D printed (i.e., additively manufactured (AM)). In another example, the impeller 904 may be molded (e.g., injection molded, extrusion molded, compression molded, etc.). The impeller 904 may be formed of a substantially single unitary unit of material (e.g., plastic, metal, composite, etc.).

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A pump assembly for creating a jet of water, the pump assembly comprising:
   a first body including:
      a front surface;
      a back surface opposite the front surface;
      at least a portion of a cavity arranged between the front surface of the first body and the back surface of the first body;
   a motor arranged adjacent to the front surface of the first body, the motor comprising:
      a rotor having a shaft extending from the motor and through the first body, the shaft including a substantially single unit of material and having an end arranged adjacent to the back surface of the first body;
   an impeller coupled to the end of the shaft, the impeller including a bearing surface received by a cooperating bearing surface arranged in a second body, the second body arranged adjacent to the back surface of the first body, and wherein the bearing surface of the impeller, and the cooperating bearing surface of the second body, support the impeller rotationally on the shaft such that when the shaft is rotatably displaced by the motor, the impeller displaces the water into the cavity arranged between the front surface of the first body and the back surface of the first body and into the second body to create the jet of water;
   wherein the first body includes a receptacle arranged in the back surface of the first body and communicatively coupled to the cavity arranged between the front surface of the first body and the back surface of the first body, and at least a portion of the impeller is received by the receptacle arranged in the back surface of the first body; and
   a plate arranged between the front surface of the first body and the motor arranged adjacent to the front surface of the first body, the plate comprising:
      a through hole for receiving at least a portion of the shaft extending from the motor;
      a sealing surface arranged around the through hole; and
      a gasket arranged around the shaft extending from the motor, the gasket to seal an interface between sealing surface of the plate and the motor.

2. The pump assembly as recited in claim 1, wherein the bearing surface of the impeller comprises a protrusion having a substantially cylindrical shape extending from a rear surface of the impeller opposite a front surface of the impeller, and the cooperating bearing surface arranged in the second body comprises a bushing or a bearing that receives at least a portion of the protrusion.

3. The pump assembly as recited in claim 1, further comprising at least one port arranged proximate to the back surface of the first body, the at least one port communicatively coupled to the receptacle arranged in the back surface of the first body to transport water from the receptacle arranged in the back surface of the first body to a heat exchanger.

4. The pump assembly as recited in claim 3, wherein the heat exchanger is for cooling the motor or cooling electronics.

5. The pump assembly as recited in claim 1, wherein the motor, the first body, and the impeller are arranged in a vessel capable of floating or submerging in the water; and
   further comprising at least one port arranged between the front surface of the first body and the back surface of the first body, the at least one port communicatively coupled to the cavity arranged between the front surface of the first body and the back surface of the first body to transport water from an inside of the vessel to the cavity arranged between the front surface of the first body and the back surface of the first body.

6. The pump assembly as recited in claim 1, further comprising:
   a weep hole communicatively coupled to the through hole to drain water received by the through hole from the cavity arranged between the front surface of the first body and the back surface of the first body.

* * * * *